United States Patent [19]

Markham

[11] Patent Number: 4,551,659

[45] Date of Patent: Nov. 5, 1985

[54] TRACKSIDE-CONTROLLED ELECTRIC RAILWAY SYSTEMS

[76] Inventor: John D. Markham, 58 Dunkirk St., Droylsden, Manchester, England, M35 7DZ

[21] Appl. No.: 540,488

[22] Filed: Oct. 11, 1983

[30] Foreign Application Priority Data

Oct. 11, 1982 [GB] United Kingdom ............... 8228981

[51] Int. Cl.[4] .............................................. H02P 3/00
[52] U.S. Cl. ................................. 318/258; 318/257; 318/269
[58] Field of Search ........................ 318/269, 257, 258

[56] References Cited

U.S. PATENT DOCUMENTS 3,100,554  8/1963  Doubek, Jr. ........................ 318/269
3,189,811  6/1965  King ................................... 318/269

FOREIGN PATENT DOCUMENTS 2652540  5/1977  Fed. Rep. of Germany ...... 318/258

*Primary Examiner*—Bernard Roskoski
*Attorney, Agent, or Firm*—Kirschstein, Kirschstein, Ottinger & Israel

[57] ABSTRACT

The trackside control includes a trackside d.c. power supply applied initially at low voltage (of selectable polarity, to determine the direction of vehicle motion along the track) and then increased (preferably with constant voltage-increase rate) to maximum supply voltage, and a trackside electrical braking load (preferably capable of forcing down at constant rate the voltage applied to it from the vehicle motor).

The motor has series and (separately excited) shunt field windings, and on-board sensing and switching circuitry which (a) in motoring, either forward or reverse, sets full series field in flux addition to limited shunt field (b) in coasting, maintains field winding switch settings, and (c) in electrical braking, sets full shunt field and reduces the now decompounding series field.

11 Claims, 3 Drawing Figures

TRACKSIDE-CONTROLLED ELECTRIC RAILWAY SYSTEMS

FIELD OF THE INVENTION

This invention relates to a trackside-controlled electric railway system and to locomotives suitable for operation in such a system.

BACKGROUND OF THE INVENTION

It is an object of the invention to provide an electric railway system in which the acceleration, running and braking of a locomotive are controlled remotely and automatically from the trackside by the use of trackside power supplies and trackside electric braking loads, and to provide a locomotive (which is to be understood as including any motorised rail vehicle) equipped with a suitable electric motor and suitable associated on-board circuitry.

In particular, it is an object of the invention to provide a locomotive having a traction motor which includes both a series field winding and a shunt, or separately-excited, field winding and in which the circuit connections of these windings are automatically altered as between driving and electric braking conditions, with a view to producing favourable performance in both conditions.

SUMMARY OF THE INVENTION

The invention provides a trackside-controlled electric locomotive incorporating an on-board d.c. power supply and a d.c. electric traction motor comprising an armature, a series field winding and a shunt winding, the armature having a first current supply connection connected to one or two pick-up shoes. The motor is controlled by a relay responsive to the occurrence of a warning signal applied to stationary power-supply conductors and indicative of the polarity of a d.c. power supply to be applied to such conductors and thereby to the said pick-up means. The relay is arranged, in response to the warning signal, to connect the series winding between one of the pick-up shoes and a current supply connection of the armature, and is responsive to the indicated polarity sense for the d.c. power to be applied to make such connection in the corresponding sense such that magnetic flux produced by the series winding due to current flowing therein in the direction corresponding to such voltage polarity is additive to magnetic flux produced by the shunt winding when excited by the on-board d.c. power supply. A polarity-sensitive bypass circuit is connected in parallel across the series winding and provides a low-impedance series-winding bypass for current flow in the direction against said voltage polarity.

The warning signal in response to which the relay is set, in preparation for the d.c. power supply which is to be applied, may be an a.c. signal applied to the power-supply conductors and thus to a decoder aboard the locomotive which senses the a.c. signal and causes the relay to be set appropriately, or it may itself be a d.c. signal, of low voltage insufficient to apply significant driving power, applied between the supply conductors with the same polarity as the d.c. power supply which is to be applied thereto thereafter.

Further preferred features of a locomotive according to the invention will be revealed in the more detailed description below.

BRIEF DESCRIPTION OF THE DRAWINGS

The invention will be described below with particular reference to the accompanying drawings, in which.

DETAILED DESCRIPTION OF THE PREFERRED EMBODIMENT

Figure 1:
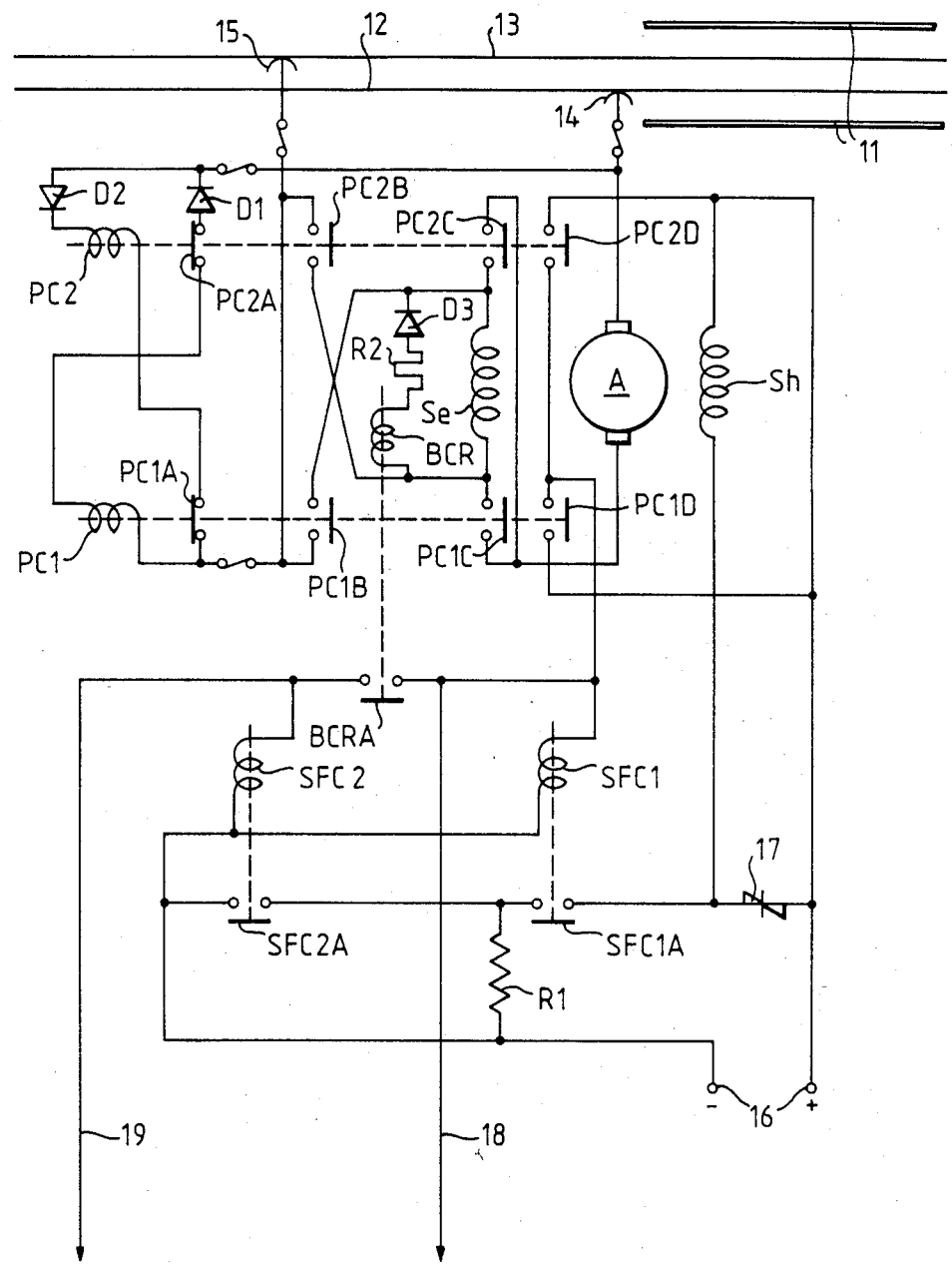
FIG. 1 is a schematic circuit diagram of a motor and associated on-board switching circuitry of a locomotive of a railway system in accordance with the invention.

As shown in FIG. 1, a railway track comprising a pair of train-carrying rails 11 is provided with a pair of spaced-apart conductor rails 12 and 13 extending along the track between the rails 11 to be engaged by respective power pick-up shoes 14 and 15 of a locomotive running of the rails 11. Preferably the rails 12 and 13 are disposed symmetrically between the rails 11, so that if the locomotive were turned to face in the opposite direction they would again be engaged by the pick-up shoes 14 and 15 (but with the shoe 14 engaging the rail 13 and the shoe 15 engaging the rail 12). As explained below, d.c. power is supplied to the locomotive via the conductor rails, and reversal of the d.c. polarity of the conductor rails reverses the direction in which the locomotive is driven.

The locomotive is equipped with a d.c. traction motor having an armature A, a series field winding Se and a shunt field winding Sh, and with a pair of power contactor relays PC1 and PC2 each connected, in series with a respective diode D1 or D2 (these being oppositely poled) between the pick-up shoes 14 and 15. Also in series with each of the relays PC1 and PC2 is a normally-closed contact PC2A or PC1A, respectively, of the other relay, so that energisation of either one of these relays positively disables the other.

The relays PC1 and PC2 also have normally-open contacts PC1B, PC1C, and PC1D and, respectively, PC2B, PC2C and PC2D. Contacts PC1B and PC1C, when closed, connect one end of the series winding Se to the pick-up shoe 15 and the other end of the winding Se to one of the two connections of the armature A, the other armature connection being connected directly to the pick-up shoe 14. Contact PC2B, when closed, connects the said other end of the series winding Se to the pick-up shoe 15, and contact PC2C then simultaneously connects the one end of the winding Se to the said one connection of the armature A. Contacts PC1D and PC2D are connected in parallel with one another, and in series with a first shunt field contactor relay SFC1, between terminals 16 connected to a d.c. source (not shown) provided aboard the locomotive for separate excitation of the shunt winding Sh. The relay SFC1 has a normally-open contact SFC1A which is connected between the terminals 16 in series with the shunt winding Sh (across which a voltage-limiting device 17 is connected) and a current-limiting resistor R1. The resistor R1 can be short-circuited, as described below, by a normally-open contact SFC2A of a second shunt field contactor relay SFC2 which is connected between the terminals 16 in series with a contact BCRA of a relay BCR which is connected, in series with a resistor R2 and diode D3, across the motor series winding Se.

The locomotive in which the motor and associated circuitry as described above are provided is also provided with a friction brake (not shown) which is biased on but is released and held released by application of a release signal to a brake connection lead 18 which is connected in parallel with the relay SFC1 so as to receive the brake release signal whenever that relay is energised.

Power for driving the locomotive is applied to the conductor rails 12 and 13 from a trackside variable-voltage d.c. source (not shown), the direction of drive being dependent on the polarity with which the d.c. power is applied to the rails. With the locomotive initially stationary and initially no power applied from the trackside source, the friction brake will be applied to hold the locomotive stationary. When, with appropriate polarity, either a soft starting-signal voltage from a separate starting source or a low starting voltage from the d.c. power source itself is applied to the rails 12 and 13, the power available will be insufficient to produce significant tractive effort but either relay PC1 or relay PC2 will be energised as determined by diodes D1 and D2 and the polarity of the applied voltage. Whichever of these relays is energised, the corresponding normally-closed contact PC1A or PC2A will be opened and the other of the two relays thereby positively disabled. Also, either contacts PC1B and PC1C, or PC2B and PC2C, will be closed so that the voltage between the rails 12 and 13 is applied across the armature A (in a direction dependent on the polarity of the applied voltage) and, in series therewith, the series winding Se (in a fixed direction, regardless of the polarity of the applied signal and, correspondingly, regardless of which of the relays PC1 and PC2 is energised). Also, either contact PC1D or PC2D is closed, so as to energise relay SFC1, which in turn closes the circuit for shunt winding Sh with the resistor R1 in series therewith. The resulting field excitation due to the shunt winding Sh is arranged to be additive with that due to the series winding Se when energised by current in the above-mentioned fixed direction in which a voltage from the trackside d.c. source is applied to the winding Se by the relays PC1 and PC2. The diode D3 is poled to be non-conductive in that direction, and accordingly the full armature current flows in the series winding Se. Also, the relay BCR remains unenergised.

Closure of contact PC1D or PC2D also applies a signal to the lead 18, causing the friction brake to be released so that the locomotive is free to move. The voltage applied to the rails from the trackside d.c. power source is then increased (or applied and increased, if the voltage applied to the rails initially was from a separate starting source) and then produces the tractive effort required to accelerate the locomotive in the direction determined by the polarity of the applied voltage. Preferably, the trackside d.c. power source is arranged to advance the voltage applied to the rails 12 and 13 at a fixed rate during acceleration up to the motor curve (irrespective of the current being drawn, since this may vary due to such variables as track gradient and the number and loading of vehicles in a train being hauled by the locomotive) though this can be made subject to an overall control limiting the maximum power demand. Preferably, also, the trackside d.c. source is arranged to maintain the voltage at maximum during motoring, and to force the voltage down, absorbing power, during regenerative braking as further described below. Once started, therefore, the locomotive is accelerated at maximum rate until the full supply voltage is reached, and acceleration continues until balance is reached. Inherent speed limitation is achieved because of the shunt excitation causing the motor characteristic to cross the axis at zero armature current. This can occur without alteration of the switching conditions, since the energised one of the two relays PC1 and PC2 is maintained in that state so long as the trackside power is applied.

Even if the trackside power is then switched off, i.e. open-circuited to the conductor rails, the locomotive will coast without alteration of the switching state, since the e.m.f. produced by rotation of the armature A in the field due to the shunt winding Sh maintains the energisation of the energised relay PC1 or PC2 and this maintains energisation of the relay SFC1 and thus of the shunt winding Sh. Coasting will continue so long as the vehicle speed remains sufficiently high, and while it does so (with the trackside power source disconnected from the conductor rails) the vehicle speed can to a first approximation be monitored at the trackside control point, if desired, by monitoring the armature e.m.f. via the conductor rails. If the trackside source is one having a blocking rectifier characteristic, it can be reconnected to the conductor rails to provide re-motoring during coasting at speed without even recycling of the switching circuitry aboard the locomotive being involved. If coasting continues until, due, for example to adverse gradient, the speed falls too low to maintain the relay PC1 or PC2 energised, it will drop out, causing the shunt winding Sh to be de-energised and the friction brake to be applied, bringing the vehicle to a halt. The locomotive can then be restarted by repeating the process described above.

Besides the above-described trackside control of motive power to the locomotive, trackside power absorption and regenerative electric braking, and trackside control thereof, are also provided. If, with the locomotive coasting as described above, i.e. with the power source disconnected from the conductor rails, some form of load is connected across the conductor rails, a current will flow in it due to the armature e.m.f. generated by the rotating armature A. This e.m.f. (as already described) maintains the energisation of whichever of the relays PC1 and PC2 was energised during motoring, but with only a very small current; when working into an external load, however, a much greater current flows, and its direction in the series winding Se is opposite to that of the current from the trackside source during motoring. This current reversal has the effect of demagnetising the motor because of the decompounding effect of the series winding Se, but the effect is much reduced because with the current direction reversed the diode D3 becomes conductive and, with the resistor R2 and relay BCR in series with it, provides a current bypass or divert path so that the current through the series winding Se is greatly reduced, to reduce the series field to, say, 40% or less of its full value. Furthermore, the resulting energisation of the relay BCR closes its contact BCRA so that the relay SFC2 in turn is energised and closes its contact SFC2A, thereby short-corcuiting the resistor R1. This results in an increased current through the motor shunt winding Sh and a corresponding increase, perhaps by a factor of three or more, in the shunt field, thereby increasing the current output and providing a full electric braking effect by absorption of the generated power into the trackside load. The power generated by the motor will be at elevated voltage while the vehicle speed is high, and it is necessary that the trackside applied load should be capable of accommodating such a voltage. Preferably, also, the load is such that it is able to load the conductor rail system in such a way as to cause the line voltage to be reduced at a predetermined rate; and it is therefore proposed to employ as the trackside load a metadyne, as described, for example, in the paper "The Metadyne, and its application to Electric Traction" by Fletcher and Tustin, in the Journal of the Institution of Electrical Engineers, Vol LXXXV(1939), pp.370-399. The electrodynamic braking will continue either until the trackside load is disconnected from the conductor rails or a voltage hold condition is reached, in which case the current falls to zero and relays BCR and SFC2 drop out so that the resistor R1 is reinserted in series with the shunt winding Sh and the coasting condition is re-established, or until the armature e.m.f. has become so low as a result of loss of vehicle speed that the relay PC1 or PC2 drops out so that electrodynamic braking ceases but the friction brake is re-applied.

Figure 2:
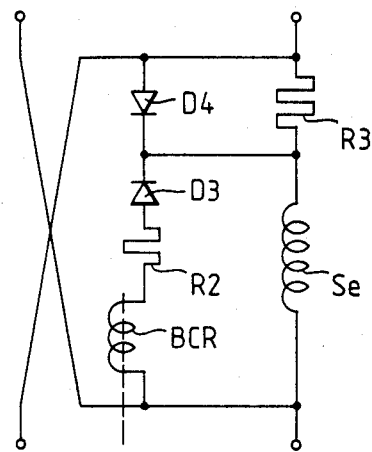
FIG. 2 shows part of the circuitry of FIG. 1, with a modification incorporated.

It will be appreciated that the single locomotive referred to in the foregoing may be one of a plurality of locomotives (which word is to be understood as including motorised car units) combined with other units in a single train or rake, and in the case of multiple locomotives (or, indeed, multiple motor units in a single locomotive) it will be necessary that there should be synchronisation in respect of motoring, coasting and braking. In particular, it will probably be necessary to impose synchronisation of the operation of contactor relays SFC2 where more than one motor unit is provided, and to that end there is shown in FIG. 1 a synchronising connection 19 connected to be controlled in parallel with the relay SFC2 by the contact BCRA and intended to be connected to the corresponding point in the circuitry of the or each other motor unit. Similar provision for synchronising other functions may also be included, if necessary. In order to achieve a reasonable sharing of load in motoring and braking between multiple motor units, it will be necessary to use motors whose motor characteristic has an adequate slope, and a true shunt-type low-resistance machine would be unsuitable. However, in order to preserve a reasonably flat characteristic with a minimum of decompounding for braking, it may be desirable to provide shunt excitation trimming compensation to allow for wheel wear; and further compensation may be desirable, in generally known manner, for matching motors to one another. It may also be desirable to include a limited amount of resistance in series with the motor during braking, in order to prevent circulating currents between motors; and this may be done (as shown in FIG. 2) by including resistance R3 in series with the motor series winding Se and its parallel current-divert circuit (diode D3, resistor R2 and relay BCR) and providing across the resistor R3 a diode D4 poled to constitute a bypass round R3 for the motor current when the motor is acting as such.

The trackside variable-voltage d.c. power source may suitably be a three-phase controlled rectifier, or a rectifier supplied by a continuously variable ratio transformer, rated, as will be apparent, for the longest (i.e. heaviest) train envisaged. As already mentioned, a metadyne system may find application in providing for the electrical braking, but power absorption may if desired be provided either by an inverting rectifier stage feeding back into the three-phase mains or by a continuously controlled loading resistance (for example, in the form of a chopper across resistance). In any event, the track-side load will be required to be able to operate from maximum voltage (which may be up to twice the nominal line voltage) down to substantially zero.

In both motoring and braking, since trains may be of differing lengths and weights, and possibly with differing numbers of motors to be supplied, it will be appropriate to control acceleration on the basis of controlled rate of change of the voltage rather than constant current. This means that the acceleration would be under "open loop" control rather than the conventional "closed loop" of current. This could lead to problems of wheelspin in lightly loaded motorised car units coupled to more heavily loaded units which must necessarily develop the same tractive effort, but this risk is mitigated by the use of compound motors with their relatively flatter characteristics in comparison with pure series wound machines.

The increase in voltage of the d.c. supply source from a low initial value, which occurs when the power is first applied, is made to be triggered by a "permit to advance volts" signal which is derived from a permissive configuration of the signalling system in conjunction with either the presence of e.m.f. on the conductor rails (showing that a train is coasting in the section) or the onset of stall current, which, with a stationary train present in the section, occurs when the relays PC1 or PC2 of the train first close in response to a starting signal. By this means the advance of the supply voltage is held if the signalling is inappropriate, or if no train is in a section or if closure of the relays PC1 and PC2 are inhibited by a guard on the train or by train-door interlock circuits (not illustrated) or similar safety provisions.

Since variations in the power supply are used to control the trains and therefore no steady continuously availably supply is available from the conductor rails, it is necessary to provide other means for supplying the shunt winding Sh (terminals 16) and other on-board auxiliaries. During running there will, of course, be some voltage available on the supply conductors, either from the trackside source or from the on-board motors during coasting and braking, and that can be used to drive an M.A. set or a compressor. Alternatively, an automotive type generator or alternator may be provided to be driven from an axle and to charge an accumulator.

Figure 3:
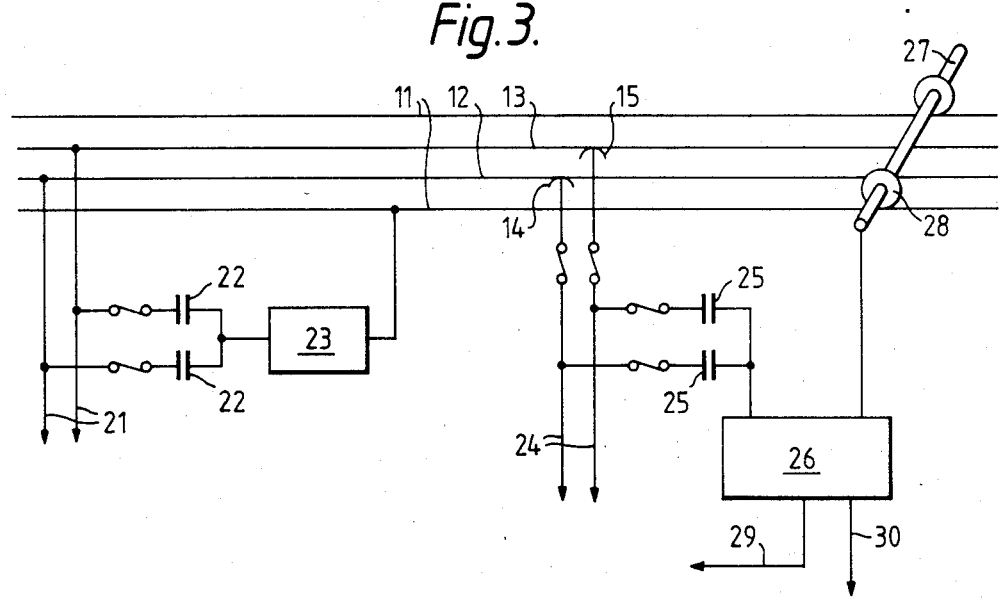
FIG. 3 shows schematically the trackside application of a.c. signals to power-supply conductor rails of the railway system and their reception on board a locomotive for controlling on-board circuitry thereof.

It will be understood that within the scope of the invention much variation is possible from what is described above, including additional refinements in the details of controlling circuitry and the like. For example, instead of utilising a purely d.c. control system as described above, use may be made of a.c. control signals injected from the trackside and filtered out and responded to by the on-board circuit. Such an arrangement is shown schematically in FIG. 3, in which leads 21, which serve to connect the conductor rails 12 and 13 to the trackside d.c. power source and trackside braking power-absorption means as required, are also connected by suitable d.c. blocking capacitors 22 to have a.c. signals applied between them and the train-carrying rails 11 by an a.c. signal injection circuit 23. On board the locomotive, correspondingly, the pick-up shoes 14 and 15 not only connect to d.c. power lead referenced here by the numeral 24, but are connected by suitable d.c. blocking capacitors 25 to a filter and detector circuit 26 which is also connected to an axle 27 of the locomotive, carrying wheels 28, which run on the rails 11 and complete the a.c. circuit. Any suitable a.c. signal system (for example, one closely similar to that for controlling subscribers' rented meters on the Post Office telephone network) may be employed for sending start signals and reverse start signals to the locomotive, or a "permission to start" signal in the absence of which a d.c. start signal in either direction will be prevented from actuating either of the relays PC1 and PC2 of FIG. 1. Thus the circuit 26 may have an output line 29 controlling a main contactor (not shown) which, in the absence of a signal on the line 29, prevents the power contactor relays PC1 and PC2 from being actuated. The friction brake control line 18, under control of the relays PC1 and PC2, might then be replaced by a friction brake control line 30 deriving its brake release signal from the a.c. detector circuit 26.

I claim:

1. A trackside-controlled electric locomotive incorporating the combination of:
   first and second current pick-up means for movable engagement with first and second stationary power-supply conductors,
   a d.c. electric traction motor comprising an armature, a series field winding and a shunt winding, the armature having a first current supply connection connected to the first said pick-up means and a second current supply connection, a shunt-winding exciting circuit, including an on-board d.c. power supply,
   first switch means responsive to the occurrence of a warning signal applied to the stationary power-supply conductors and indicative of the polarity of a d.c. power supply to be applied to such conductors and thereby to the said pick-up means, said first switch means being arranged, in response to said warning signal, to connect the series winding between the second said pick-up means and the said second current supply connection of the armature, and responsive to the indicated polarity sense for the d.c. power to be applied to make such connection in the corresponding sense such that magnetic flux produced by the series winding due to current flowing therein in the direction corresponding to such voltage polarity is additive to magnetic flux produced by the shunt winding when excited by the onboard d.c. power supply, and
   a polarity-sensitive bypass circuit connected in parallel across the series winding and providing a low-impedance series-winding bypass for current flow in the direction against said voltage polarity.

2. A locomotive as claimed in claim 1, wherein the warning signal is an information-carrying a.c. signal applied to the stationary power conductors and the locomotive is provided with decoding means connected to the current pick-up means for reception of such a.c. signals and connected also to control the response of the first switch means.

3. A locomotive as claimed in claim 1 wherein the warning signal is a low-voltage d.c. signal applied between the stationary power conductors with the same polarity as the d.c. power supply which is to be applied thereto thereafter.

4. A locomotive as claimed in claim 3, including second switch means controlled by the first switch means and arranged to switch on the shunt-winding exciting circuit only when the first switching means connects the series winding in circuit with the armature.

5. A locomotive as claimed in claim 3 and including a current-limiting resistor in the shunt-winding exciting circuit in series with the shunt winding, and third switch means, responsive to current flow in the series-winding by pass circuit, arranged, in response to such current flow, to short-circuit the said current limiting resistor in the shunt-winding exciting circuit.

6. A locomotive as claimed in claim 3, wherein the first switch means comprises two relays each connected, in series with a respective one of two oppositely poled diodes and with a normally-closed contact controlled by the other of the two relays and opened thereby upon energisation thereof, between the said first and second pick-up means.

7. A locomotive as claimed in claim 6, wherein each of the said two relays also has two normally-open contacts which, when closed, connect opposite ends of the series winding to the said second current supply connection of the armature and to the said second current pick-up means, that end of the series winding which is connected by a contact of one of the two relays to the armature being connected by a contact of the other of the two relays to the second current pick-up means.

8. A locomotive as claimed in claim 7, wherein the two relays each have a further normally-open contact, these being connected in parallel with one another and in series with a further relay constituting second switch means and having a contact in series with the shunt winding in the shunt-winding exciting circuit.

9. A locomotive as claimed in claim 3, wherein the series-winding bypass circuit includes a resistor and a diode in series, across the series winding.

10. A locomotive as claimed in claim 5, wherein the third switch means includes a relay in the series-winding bypass circuit for actuation by current flow therein and a relay contact responsive to such actuation to short-circuit the said current limiting resistor.

11. A locomotive as claimed in claim 1, and provided with a friction brake biassed to an operative braking condition but releasable in response to actuation of the first switch means.

* * * * *